(12) United States Patent
Wang et al.

(10) Patent No.: US 9,875,359 B2
(45) Date of Patent: Jan. 23, 2018

(54) SECURITY MANAGEMENT FOR RACK SERVER SYSTEM

(71) Applicant: Quanta Computer Inc., Taoyuan (TW)

(72) Inventors: Wei-Chun Wang, Taoyuan (TW); Wei-Yu Chien, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 112 days.

(21) Appl. No.: 14/883,124

(22) Filed: Oct. 14, 2015

(65) Prior Publication Data

US 2017/0109531 A1 Apr. 20, 2017

(51) Int. Cl.
*G06F 21/57* (2013.01)
*H04L 9/32* (2006.01)
*H04L 29/06* (2006.01)

(52) U.S. Cl.
CPC .......... *G06F 21/575* (2013.01); *H04L 9/3234* (2013.01); *H04L 63/1408* (2013.01); *H04L 63/20* (2013.01)

(58) Field of Classification Search
CPC ............................ G06F 11/1417; G06F 21/575
See application file for complete search history.

(56) References Cited

U.S. PATENT DOCUMENTS

| | | | |
|---|---|---|---|
| 2009/0276617 A1* | 11/2009 | Grell | G06F 21/575 713/2 |
| 2014/0331037 A1* | 11/2014 | Lewis | G06F 9/4401 713/2 |
| 2015/0089209 A1* | 3/2015 | Jacobs | G06F 21/575 713/1 |
| 2015/0193620 A1* | 7/2015 | Khatri | G06F 21/575 713/2 |

* cited by examiner

*Primary Examiner* — Albert Wang
(74) *Attorney, Agent, or Firm* — Nixon Peabody LLP; Eduardo J. Quinones; Zhou Lu

(57) ABSTRACT

Various embodiments of the present technology provide methods for activating a security module of a rack system prior to the loading of an operating system. The security module can be configured to examine server platform security, communicate with an administrator through a baseboard management controller (BMC), certify signatures of firmware pieces on a motherboard of the rack system, exclude malware by isolating unsigned UEFI images, examine a signature list and security key installed on the motherboard, and/or report status of security management to a controller of the rack system (e.g., BMC). When the security module determines that an uncertified firmware or a bootable storage with malware is loaded onto the rack system, the security module can stop process(es) associated with the uncertified firmware and/or the bootable storage, and subsequently send a report the administrator.

20 Claims, 10 Drawing Sheets

SECURITY MANAGEMENT FOR RACK SERVER SYSTEM

TECHNICAL FIELD

The present technology relates generally to server systems in a telecommunications network.

BACKGROUND

Server security allows a data center to protect server data from malicious attacks over networks. In conventional systems, a trust chaining mechanism on blocks is usually used to protect a server platform or a portion of the server platform from attacks. When a server platform powers on, a unified extensible firmware interface (UEFI) BIOS initializes hardware components and loads operating system (OS). The UEFI BIOS can access all data and information residing on server storage without any constraint. Some server systems further certifies the UEFI BIOS as one block of trust train based on specifications such as TCG PC Client Specific Implementation Specification for Conventional BIOS and TCG EFI Platform.

However, in conventional rack systems, security applications reside in an OS layer and become active only after OS loading. A hacker may attack the rack system by replacing bootable storage with malware or plug-in malicious UEFI driver before the OS loading.

SUMMARY

Systems and methods in accordance with various embodiments of the present technology provide a solution to the above-mentioned problems by using a security module to collect status of trust chain, monitor driver secure signed, and certify rack server signature list. More specifically, various embodiments of the present technology provide systems and methods for activating a security module of a rack system prior to the loading of an operating system. The security module can be configured to examine server platform security, communicate with an administrator through a baseboard management controller (BMC), certify signatures of firmware pieces on a motherboard of the rack system, exclude malware by isolating unsigned UEFI images, examine a signature list and security key installed on the motherboard, and/or report status of security management to a controller of the rack system (e.g., BMC). When the security module determines that an uncertified firmware or a bootable storage with malware is loaded onto the rack system, the security module can stop process(es) associated with the uncertified firmware and/or the bootable storage, and subsequently send a report to the BMC or the administrator.

In some embodiments, a security module is configured to determine whether hardware and firmware of a rack system, or executable image from a third party is secure in the system. In some implementations, the security module can check settings of secure registers to determine whether write protection mechanism(s) is enabled for a flash chip of the rack system, and, in response to determining that a malware attempts to write to the flash chip, invoke an unmask interruption service routine. The security module can also manage self-encrypting drives (SED) key installation and get password or security key from out of band using UEFI EFI_Key_Management_Service_Protocol (KMS) for drives of the rack system. The security module may be further configured to deliver a value of a cryptographic hash function from a trust platform module (TPM) to a controller (e.g., BMC) of the rack system.

In some implementations, a security module can compare a signature signed for each UEFI driver of the rack system with signatures stored in an authorized database of the system, and invoke an unsigned UEFI drive by overriding the signature with a gold key from a controller (e.g., BMC) of the rack system. The security module may deliver status of UEFI driver signature signed to the controller and support the controller to monitor, generate or delete an authorized database. In some implementations, the security module may be further configured to support monitoring of network protocols in the rack system, blocking I/O protocol(s) invoked by a UEFI driver, or set the attribute routine of a network request as "call-back" prior to getting access permission from the controller. In some implementations, a security module can compare a signature signed for each executable image of the rack system with signatures in an authorized database, and invoke an unsigned bootable image by overriding the signature with a gold key from a controller (e.g., BMC) of the rack system.

In some embodiments, a security module can communicate with a controller of a rack system using OEM IPMI commands or a private mail box supported by silicon. The security module invokes corresponding OEM IPMI commands in response to different security reporting, policy reading, security key requests, or signature database management.

In some embodiments, an unmask service routine includes logging a security event to a controller of a rack system when a malware or a third party application/firmware attempts to change a security function, security key or update firmware without a permission. In some embodiments, a "call-back" routine is invoked when a third party application or firmware attempts to access storage or network of the rack system during a power-on self-test (POST). Before "Block I/O Protocol" or "Network Protocol" can be performed for the third party application or firmware, permission from a controller of the rack system is required.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

More specifically, various embodiments of the present technology provide systems and methods for activating a security module of a rack system prior to the loading of an operating system. The security module can be configured to examine server platform security, communicate with an administrator through a baseboard management controller (BMC), certify signatures of firmware pieces on a motherboard of the rack system, exclude malware by isolating unsigned UEFI images, examine a signature list and security key installed on the motherboard, and/or report status of security management to a controller of the rack system (e.g., BMC). When the security module determines that an uncertified firmware or a bootable storage with malware is loaded onto the rack system, the security module can stop the process(es) associated with the uncertified firmware and/or the bootable storage, and subsequently send a report the administrator.

Figure 1A:
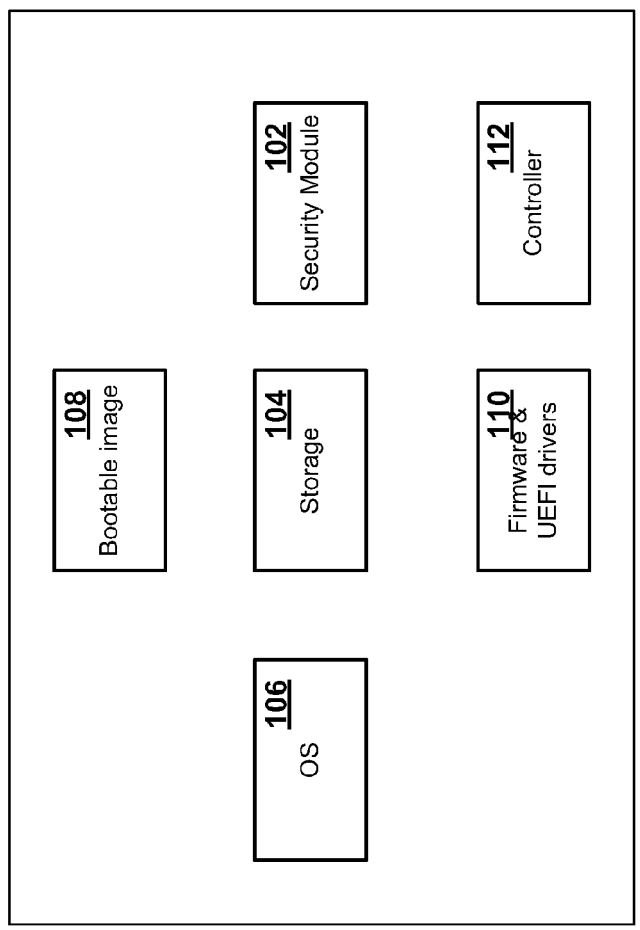
FIG. 1A illustrates a schematic block diagram of an exemplary rack system in accordance with an implementation of the present technology.

FIG. 1A illustrates a schematic block diagram of an exemplary rack system 10 in accordance with an implementation of the present technology. The rack system comprises one or more server systems. In this example, the rack system 10 includes a security module 102, one or more storage 104, an operating system 106, one or more bootable image 108, a plurality of firmware and UEFI drivers 110, and one or more controllers (e.g., a baseboard management controller (BMC) or a rack management controller (RMC)). The security module 102 that can reside on a basic input/output system (BIOS) of the rack system 10, and be configured to monitor status of UEFI drivers and firmware 110, bootable images 108, server security passwords and/or security keys, and report status of server security to the controller 112 or an administrator.

The security module 102 can be activated when the rack system 10 powers on. Prior to the OS 106 being loaded, the security module 102 can report security status and policies of the rack system 10 out of band through the controller 112. In response to detecting an uncertified firmware or bootable image with malware being loaded into the racking system 10 and attempting to access data stored on the storage 104 or other storage blocks, the security module 102 can stop the process and send a report to an administrator of the rack system 10.

Figure 1B:
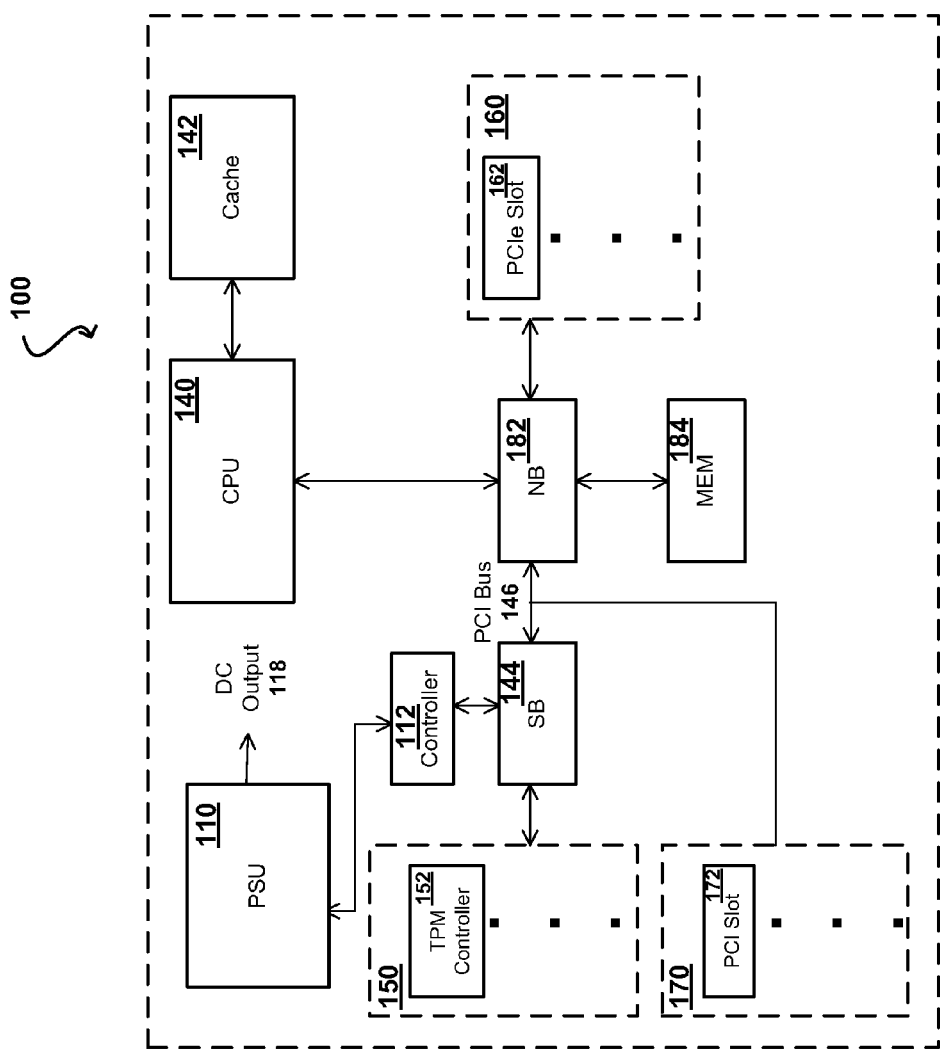
FIG. 1B illustrates a schematic block diagram of an exemplary server system in accordance with an implementation of the present technology.

FIG. 1B illustrates a schematic block diagram of an exemplary server system 100 in accordance with an implementation of the present technology. In this example, the server system 100 comprises at least one microprocessor or CPU 140 connected to a Cache 142, a main Memory 184, and one or more PSUs 110 that provides power to the server system 100. The main Memory 184 can be coupled to the CPU 140 via a north bridge (NB) logic 130. A memory control module (not shown) can be used to control operations of the Memory 184 by asserting necessary control signals during memory operations. The main Memory 184 may include, but is not limited to, dynamic random access memory (DRAM), double data rate DRAM (DDR DRAM), static RAM (SRAM), or other types of suitable memory.

In some implementations, the CPU 140 can be multi-core processors, each of which is coupled together through a CPU bus connected to the NB logic 130. In some implementations, the NB logic 182 can be integrated into the CPU 140. The NB logic 182 can also be connected to a plurality of peripheral component interconnect express (PCIe) ports 160 and a south bridge (SB) logic 140 (optional). The plurality of PCIe ports 160 can be used for connections and buses such as PCI Express x1, USB 2.0, SMBus, SIM card, future extension for another PCIe lane, 1.5 V and 3.3 V power, and wires to diagnostics LEDs on the server's chassis.

In this example, the NB logic 182 and the SB logic 140 are connected by a peripheral component interconnect (PCI) Bus 146. A PCI Bus can support function on the CPU 140 but in a preferably standardized format that is independent of any of CPU's native buses. The PCI Bus 146 can be further connected to a plurality of PCI slots 170 (e.g., a PCI Slot 172). Devices connected to the PCI Bus 146 may appear to a bus controller (not shown) to be connected directly to a CPU bus, assigned addresses in the CPU 140's address space, and synchronized to a single bus clock. PCI cards can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 140 can couple the PCI Bus 146 to a plurality of peripheral IO devices 150 (e.g., a TPM controller 152) via an expansion bus. The expansion bus can be a bus used for communications between the SB logic 140 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In the example, the SB logic 140 is further coupled to a Controller 112 that is connected to the one or more PSUs 110. The one or more PSUs 110 are configured to supply powers to various component of the server system 100, such as the CPU 140, Cache 142, NB logic 130, PCIe slots 160, Memory 184, SB logic 140, peripheral IO devices 150, PCI slots 170, and Controller 112. After being powered on, the server system 10 is configured to load software application from memory, computer storage device, or an external storage device to perform various operations.

In some implementations, the Controller 112 can be a baseboard management controller (BMC), rack management controller (RMC), a keyboard controller, or any other suitable type of system controller. In some embodiments, the Controller 112 can be configured to control operations of the server system 100 and/or communicate with an administrator over a network.

In some implementations, the Controller 112 can collect parameters (e.g., temperature, cooling fan speeds, power status, memory and/or operating system (OS) status) from different types of sensors that are built into the server system 100. In some implementations, the Controller 112 can also be configured to take appropriate action when necessary. For example, in response to any parameter on the different types of sensors that are built into the server system 10 going beyond preset limits, which can indicate a potential failure of the server system 100, the Controller 112 can be configured to perform a suitable operation in response to the potential failure. The suitable operation can include, but is not limited to, sending an alert to the CPU 140 or a system administrator over a network, or taking some corrective action such as resetting or power cycling the node to get a hung OS running again).

Although only certain components are shown within the server system 100 in FIG. 1B and the rack system 10 in FIG. 1A, various types of electronic or computing components that are capable of processing or storing data, or receiving or transmitting signals can also be included in the server system 100 in FIG. 1B and the rack system 10 in FIG. 1A. Further, the electronic or computing components in the server system 100 in FIG. 1B and the rack system 10 in FIG. 1A can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the server system 100 in FIG. 1B and the rack system 10 in FIG. 1A, a variety of networking and messaging protocols can be used, including but not limited to TCP/IP, open systems interconnection (OSI), file transfer protocol (FTP), universal plug and play (UPnP), network file system (NFS), common internet file system (CIFS), AppleTalk etc. As would be appreciated by those skilled in the art, the server system 100 in FIG. 1B and the rack system 10 in FIG. 1A are used for purposes of explanation. Therefore, a network system can be implemented with many variations, as appropriate, yet still provide a configuration of network platform in accordance with various embodiments of the present technology.

In exemplary configuration of FIG. 1B and FIG. 1A, the server system 100 in FIG. 1B and the rack system 10 in FIG. 1A can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various embodiments.

Figure 2:
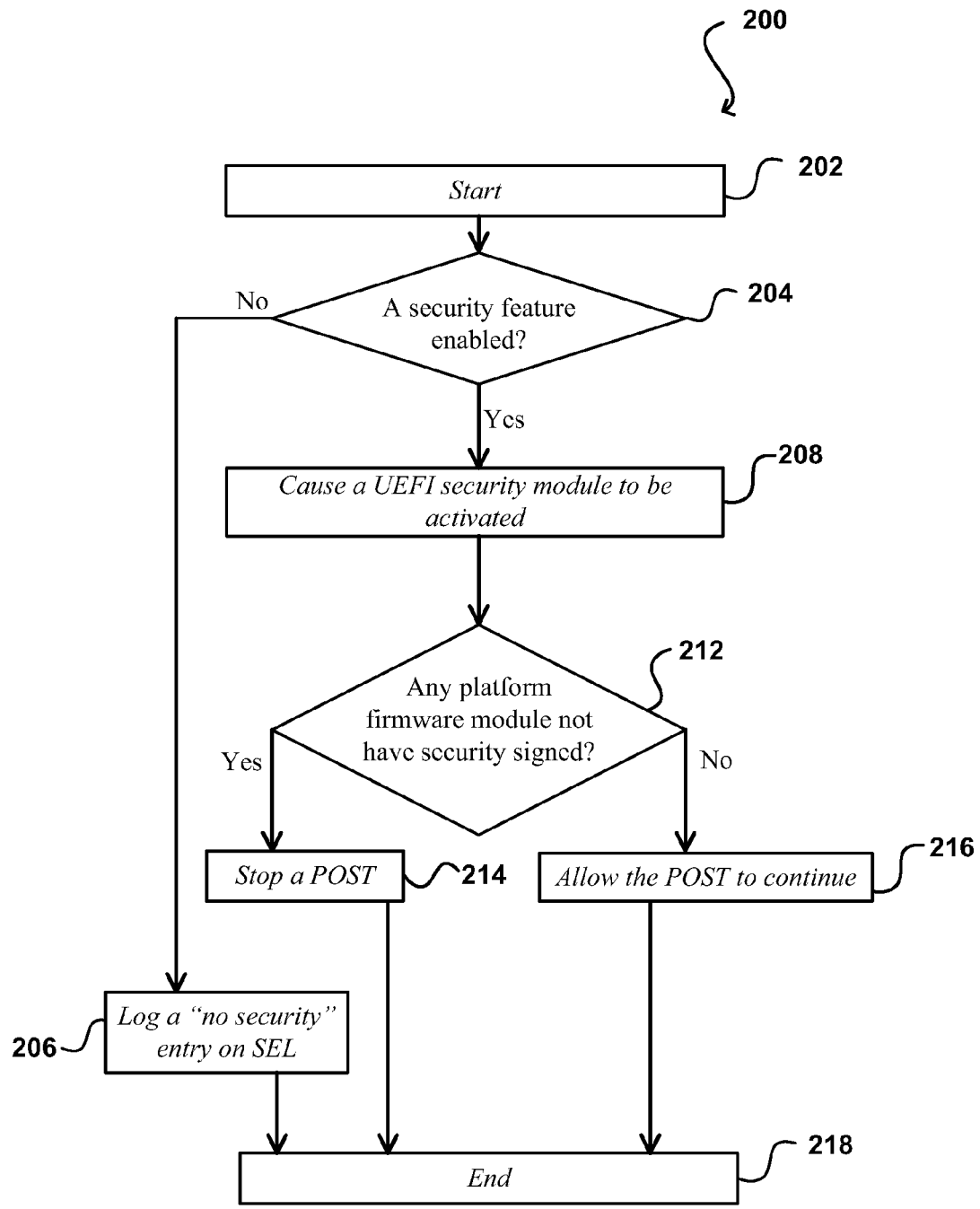
FIG. 2 illustrates an exemplary method of security management in a rack system in accordance with an implementation of the present technology.

FIG. 2 illustrates an exemplary method 200 of security management in a rack system in accordance with an implementation of the present technology. It should be understood that the exemplary method 200 is presented solely for illustrative purposes and that in other methods in accordance with the present technology can include additional, fewer, or alternative steps performed in similar or alternative orders, or in parallel. The exemplary method 200 starts at step 202.

At step 204, a security feature of the rack system is checked to determine whether the security feature is enabled. The security feature can include enabling a write protection mechanism to a flash chip of the rack system, enabling a trust platform module (TPM), or enabling a security boot. If the security feature of the rack system is not enabled, a "no security" entry can be logged on a system event log (SEL) of the rack system, at step 206.

At step 208, in response to the security feature being enabled, a security module (e.g., as illustrated in FIG. 1A) is activated prior to an operating system of the rack system is loaded. In some embodiments, the security module can check each UEFI driver of the rack system by comparing a corresponding signature with values of an authorized signature list and report a status of the comparison to a controller of the rack system. In some embodiments, the security module can send a value of cryptographic hash function from a trust platform module (TPM) to a controller of the rack system and enable the controller to modify an authorized signature list.

In some embodiments, the security module can receive an executable image from a third party UEFI driver, compare a signature of the executable image with values of an authorized signature list, and, in response to determining that the signature of the executable image is unsigned, enable a controller of the rack system to override the executable image with a gold key. In some implementations, the security module can further receive a corresponding policy from the controller for the UEFI driver and exclude an UEFI driver if a corresponding signature of the UEFI driver is not in the authorized signature list. However, other security check methods are possible in light of the present technology. Embodiments of the present technology are not limited to examples illustrated in the present patent application.

At step 212, the security module can check whether any of platform firmware modules of the rack system does not have security signed. In response to determining that a platform firmware module of the rack system does not have security signed, the security module can stop a POST process, at step 214. In some embodiments, the security module can further log a "firmware not signed" entry on the SEL, and send a report out of band to an administrator.

In response to determining that all firmware modules of the rack system have security signed, the security module allows the POST to continue, at step 216. The method process 200 ends at step 218.

In some embodiments, the security module can receive a security-key request from a device firmware or an operating system of the rack system and send an OEM IPMI command together with a key management interoperability protocol (KMIP) parameter complying with a controller (e.g., BMC) of the rack system. A non-limiting example of the OEM IPMI commands is listed below in Table 1.

TABLE 1

| OEM IPMI commands REQ | Description | Priority |
| --- | --- | --- |
| Delivery value of cryptographic hash from TPM to BMC | Deliver TPM PCR with the hash result to BMC. PCR[0] response for examination of CRTM, EFI boot service and EFI runtime service. PCR[1] response for examination of platform configuration. | Mandatory |

TABLE 1-continued

| OEM IPMI commands REQ | Description | Priority |
|---|---|---|
| | PCR[2] response for examination of PCI option-rom code. PCR[3] response for examination of PCI option-rom configuration data. PCR[4] response for examination of (Initial Program Loader) IPL PCR[5] response for examination of IPL configuration and data. PCR[6] response for examination of state transition. PCR[7] response for examination of Host Platform Manufacture Control. | |
| Deliver status of UEFI driver signature signed to BMC | Deliver status of UEFI driver with its signature signed to BMC. Validate signature of UEFI option-rom code from PCIe adaptors. Validate signature of executable EFI firmware from signature database. | Mandatory |
| Deliver status of hardware secure | Deliver status of hardware register programming on motherboard. Inspect flash chip write protected - disable flash regions accessed permission register. | Mandatory |
| Get policy for signature is not in mesh into signature database | Get policy from BMC. Invoke UEFI driver without considering signature in mesh. Exclude UEFI driver if no signature in mesh in signature database. | Mandatory |
| Manage signature database from out of band | Deliver valid signature list per Signature Owner & Type for BMC. Add valid signature into signature database by requesting to BMC. Delete valid signature from signature database per demanding from BMC. | Optional |
| Support KMS protocol over IPMI | Communicate with BMC for SED security key request. Response for security key request from device firmware, operating system and UEFI security feature. Send OEM IPMI command of security key requesting with key management interoperability protocol (KMIP) parameter compliant to BMC. | Optional |

In some embodiments, the security module can invoke a call-back routine when a third party UEFI driver is accessing the rack system during a POST and block an IO protocol or a network protocol of the third party UEFI driver prior to receiving an authorization from a controller (e.g., BMC) of the rack system. A non-limiting example of system management interrupts (SMI) service routine (e.g., the call-back routine) is listed below in Table 2.

TABLE 2

| SMI Service Routine | Description | Priority |
|---|---|---|
| Send event log to BMC | Log system event log to BMC with following conditions. $3^{rd}$ party application/firmware force to enable flash write protected. $3^{rd}$ party application/firmware disable platform security function. (TPM disabled, security boot disabled, security flash disabled) $3^{rd}$ party application/firmware change platform key (PK) and key exchanged key (KEK) of rack system. | Mandatory |
| Get permission from BMC | Install call-back routine for all "block I/O protocol" and "network protocol" which is consumed by $3^{rd}$ party UEFI driver. Invoke call-back routine when $3^{rd}$ party UEFI driver is accessing rack server storage and network during POST. Get permission from BMC prior to perform "block I/O protocol" and "network protocol" for $3^{rd}$ party UEFI driver. | Optional |

Figure 3:
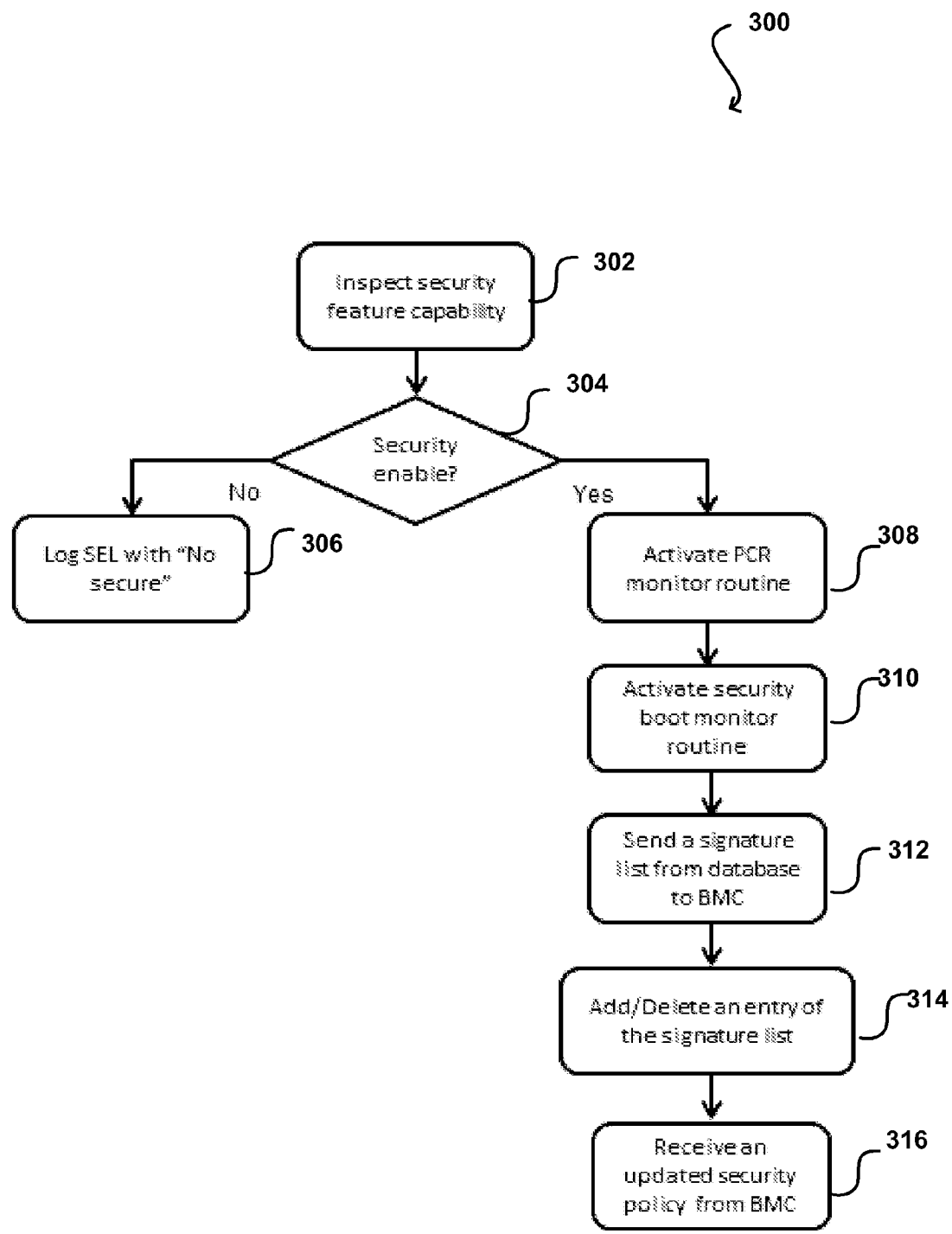
FIG. 3 illustrates another exemplary method of security management in a rack system in accordance with an implementation of the present technology.

FIG. 3 illustrates another exemplary method 300 of security management in a rack system in accordance with an implementation of the present technology. At step 302, a security feature of the rack system is inspected. A determination can be made whether the security feature is enabled, at step 304. In response to determining that the security feature is not enabled, a "no secure" entry is logged on a SEL of the rack system, at step 306. In response to determining the security feature is enabled, a platform configuration register (PCR) monitor routine can be activated, at step 308.

At step 310, a security boot monitor routine can be activated. A signature list can be sent from a database to a BMC of the rack system, at step 312. BMC can add or delete any entry of the signature list, at step 314. An updated security policy can be received from the BMC, at step 316.

Figure 4:
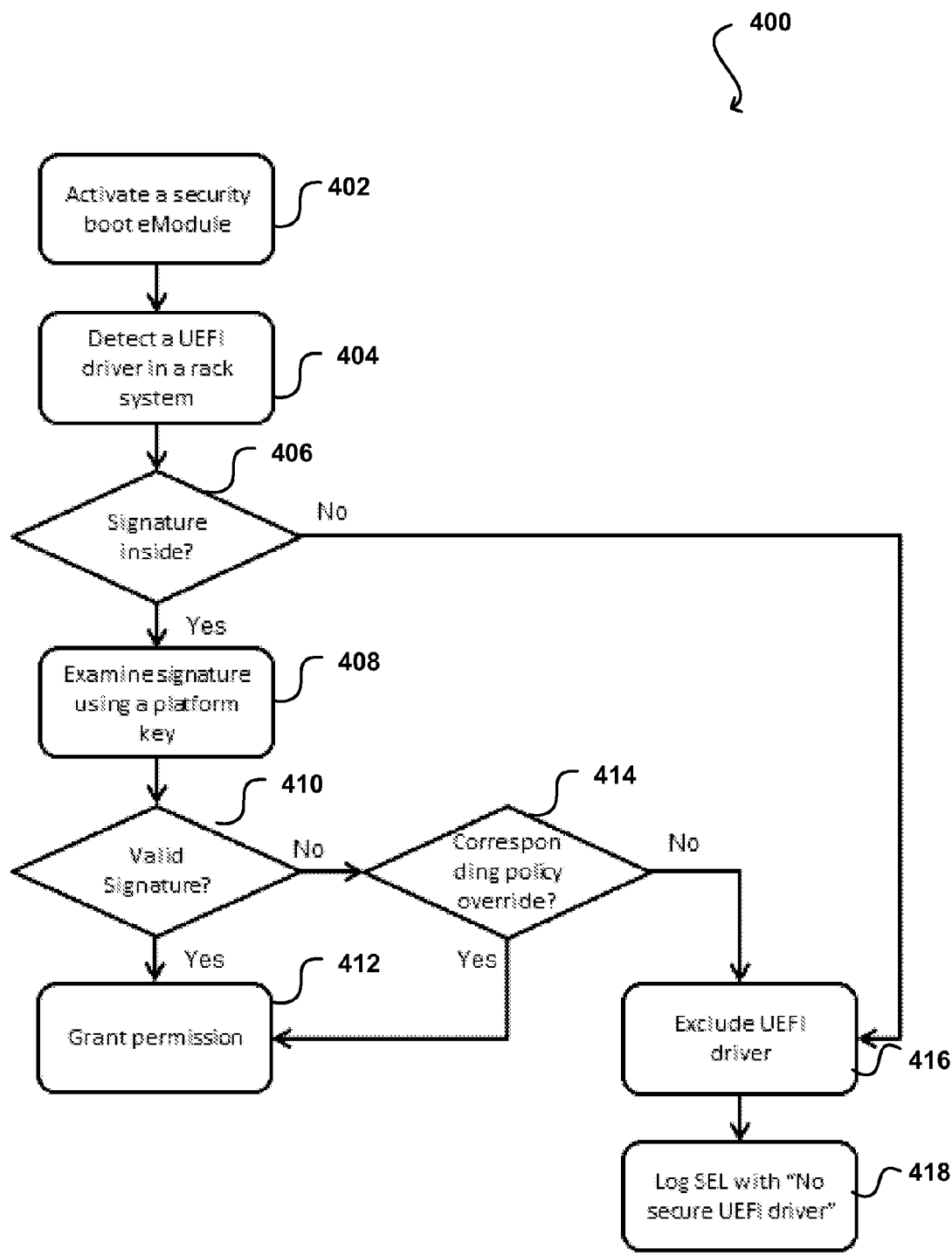
FIG. 4 illustrates yet another exemplary method of security management in a rack system in accordance with an implementation of the present technology.

FIG. 4 illustrates yet another exemplary method 400 of security management in a rack system in accordance with an implementation of the present technology. At step 402, a Security eModule is activated. The Security eModule can detect a UEFI driver in the rack system, at step 404. A determination can be made whether the UEFI driver has signature inside, at step 406. In response to determining that the UEFI driver does not have a signature, the Security eModule can exclude the UEFI driver, at step 416. A "no secure UEFI driver" entry can be logged on a SEL of the rack system, at step 418.

In response to determining that the UEFI driver has a signature, the Security eModule can examine the signature using a platform key, at step 408. A determination can be made whether the signature is valid, at step 410. In response to determining that the signature is not valid, a determination can be made whether a corresponding policy is overridden, at step 414. In response to determining that the policy is not overridden, the UEFI driver is excluded, at step 416. In response to determining that either the signature is valid or the policy is overridden, permission is granted for the UEFI driver, at step 412.

Figure 5:
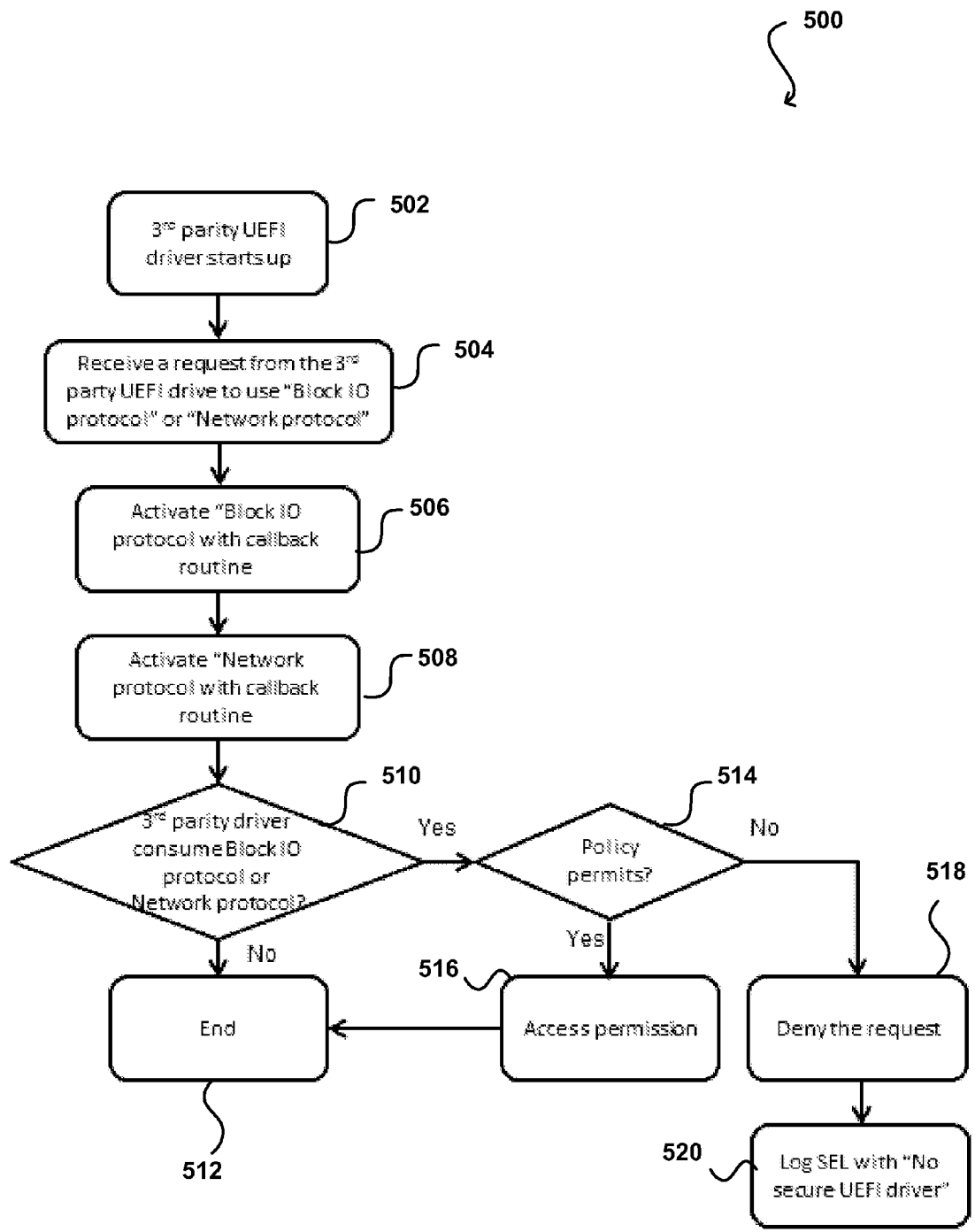
FIG. 5 illustrates yet another exemplary method of security management in a rack system in accordance with an implementation of the present technology.

FIG. 5 illustrates yet another exemplary method 500 of security management in a rack system in accordance with an implementation of the present technology. At step 502, a third party UEFI driver starts up. A request is received from the third party UEFI driver to use "Block I/O protocol" or "Network protocol," at step 504. "Block I/O protocol" together with a call-back routine can be activated by a BIOS of the rack system, at step 506. "Network protocol" together with a call-back routine can be activated by the BIOS, at step 508.

A determination can be made whether the third party driver consumes "Block I/O protocol" or "Network protocol," at step 510. In response to determining that the third party driver consumes either "Block I/O protocol" or "Network protocol," another determination can be made whether the request from the third party driver is consistent with a corresponding policy of the rack system, at step 514. In response to determining that the request is inconsistent with the corresponding policy, the access request from the third party driver is denied, at step 518. An entry of "No secure UEFI driver" can be logged on a SEL of the rack system, at step 520.

In response to determining that the access request from the third party driver is consistent with the corresponding policy, the access request can be granted at step 516. The method process 500 ends at step 512.

Figure 6:
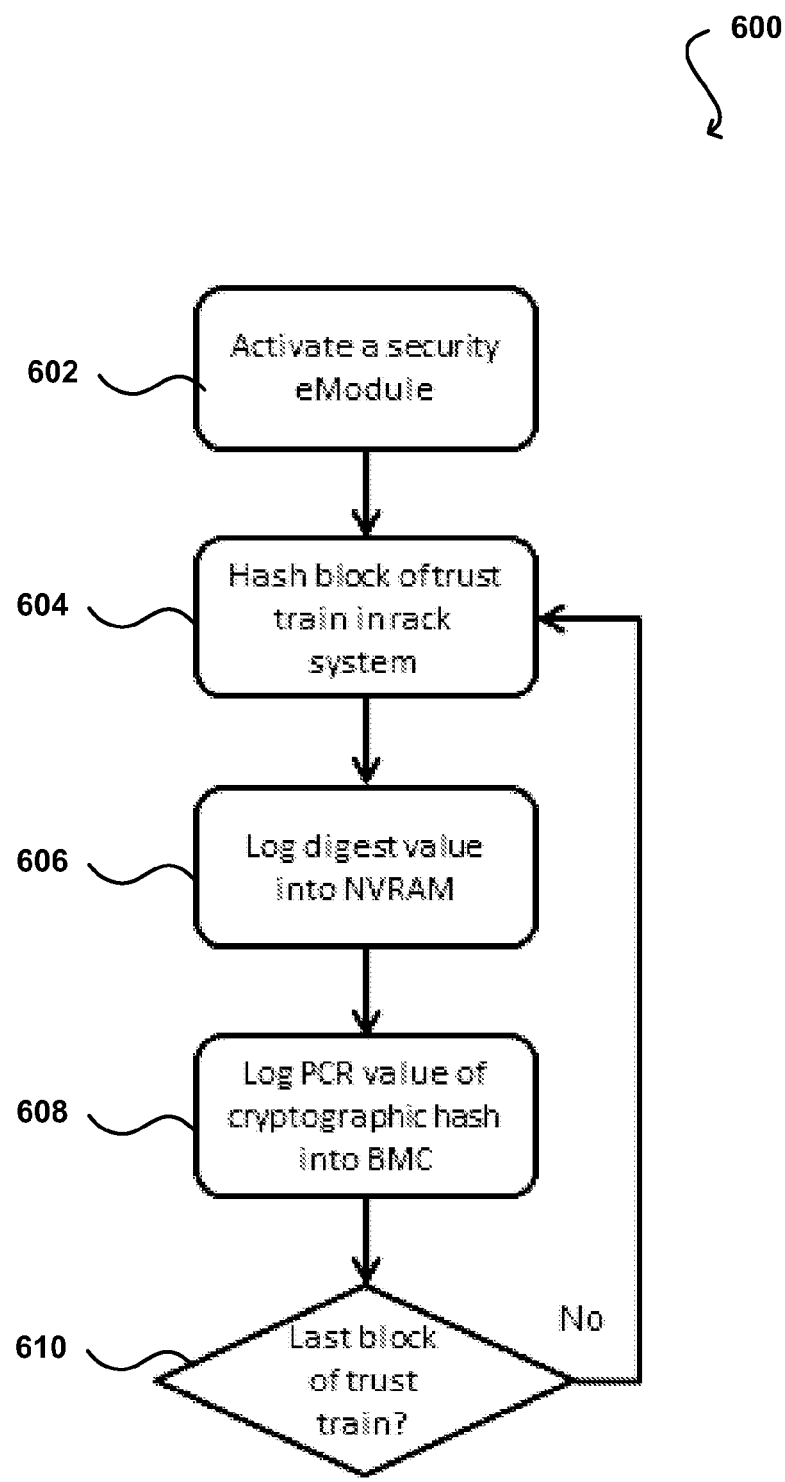
FIG. 6 illustrates yet another exemplary method of security management in a rack system in accordance with an implementation of the present technology.

FIG. 6 illustrates yet another exemplary method 600 of security management in a rack system in accordance with an implementation of the present technology. At step 602, a Security eModule is activated. A block of trust train in the rack system can be hashed at step 604. A digest value can be logged into a non-volatile random-access memory (NVRAM) of the rack system, at step 606. A platform configuration register (PCR) value of the cryptographic hash can be logged to a BMC of the rack system, at step 608. In response to determining that more blocks of trust train need to be hashed, the method process 600 goes back to step 604.

Figure 7:
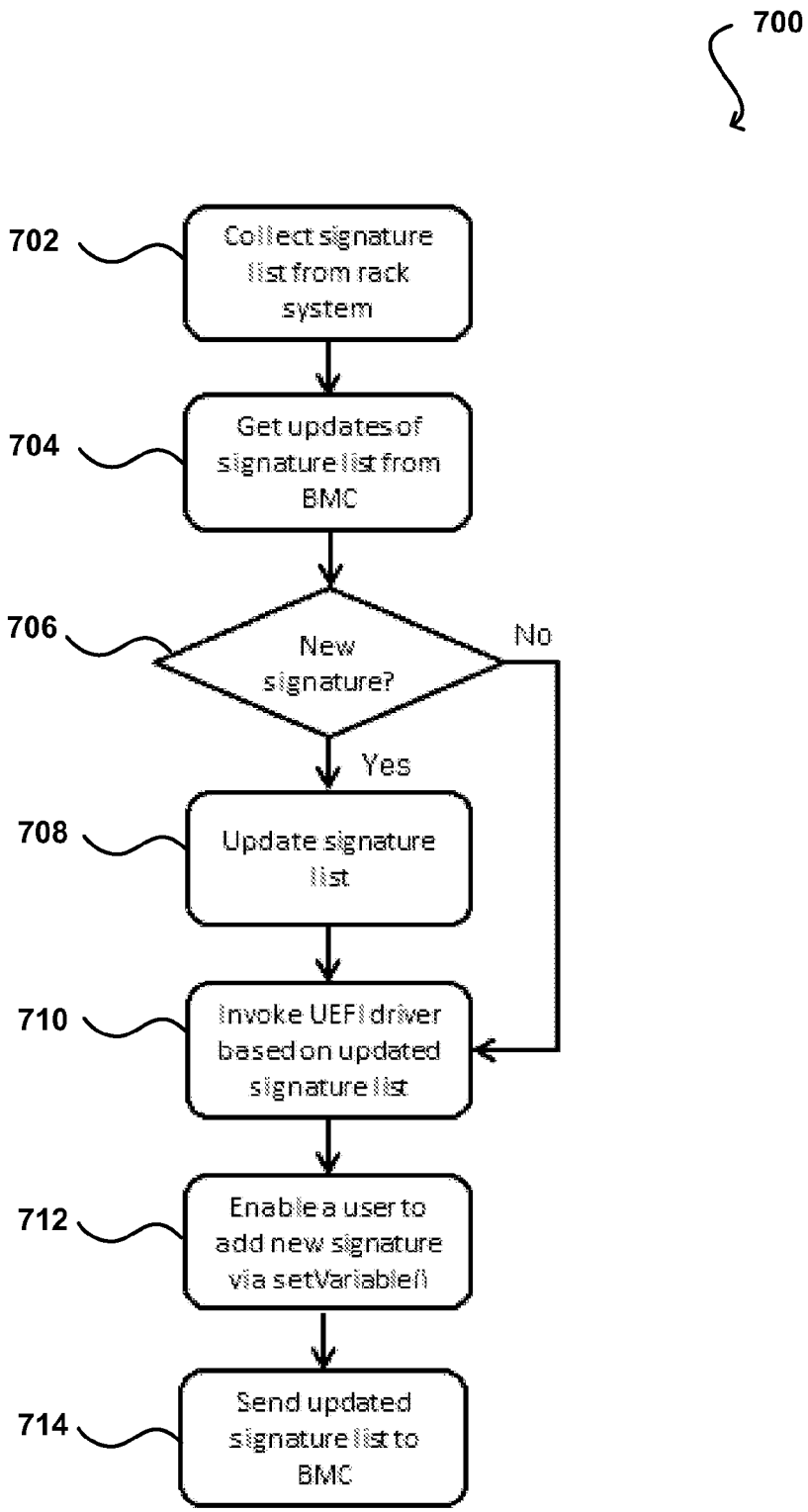
FIG. 7 illustrates yet another exemplary method of security management in a rack system in accordance with an implementation of the present technology.

FIG. 7 illustrates yet another exemplary method 700 of security management in a rack system in accordance with an implementation of the present technology. A security module can collect a signature list from the rack system, at step 702. The security module can further communicate with a BMC of the rack system to get updates of the signature list, at step 704. A determination can be made whether there is a new signature, at step 706. In response to finding the new signature, the security module can update the signature list accordingly, at step 708. A UEFI driver can be invoked based upon the updated signature list or the original signature list if no new signature is found, at step 710. The security module can also enable a user or an administrator to add a new signature to the signature list by calling setVariable( ) at step 712. The security module may further send the new signature list to the BMC, at step 714.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 3 and 4, is disclosed herein. These variations shall be described herein as the various examples are set forth. The technology now turns to FIG. 3.

Figure 8:
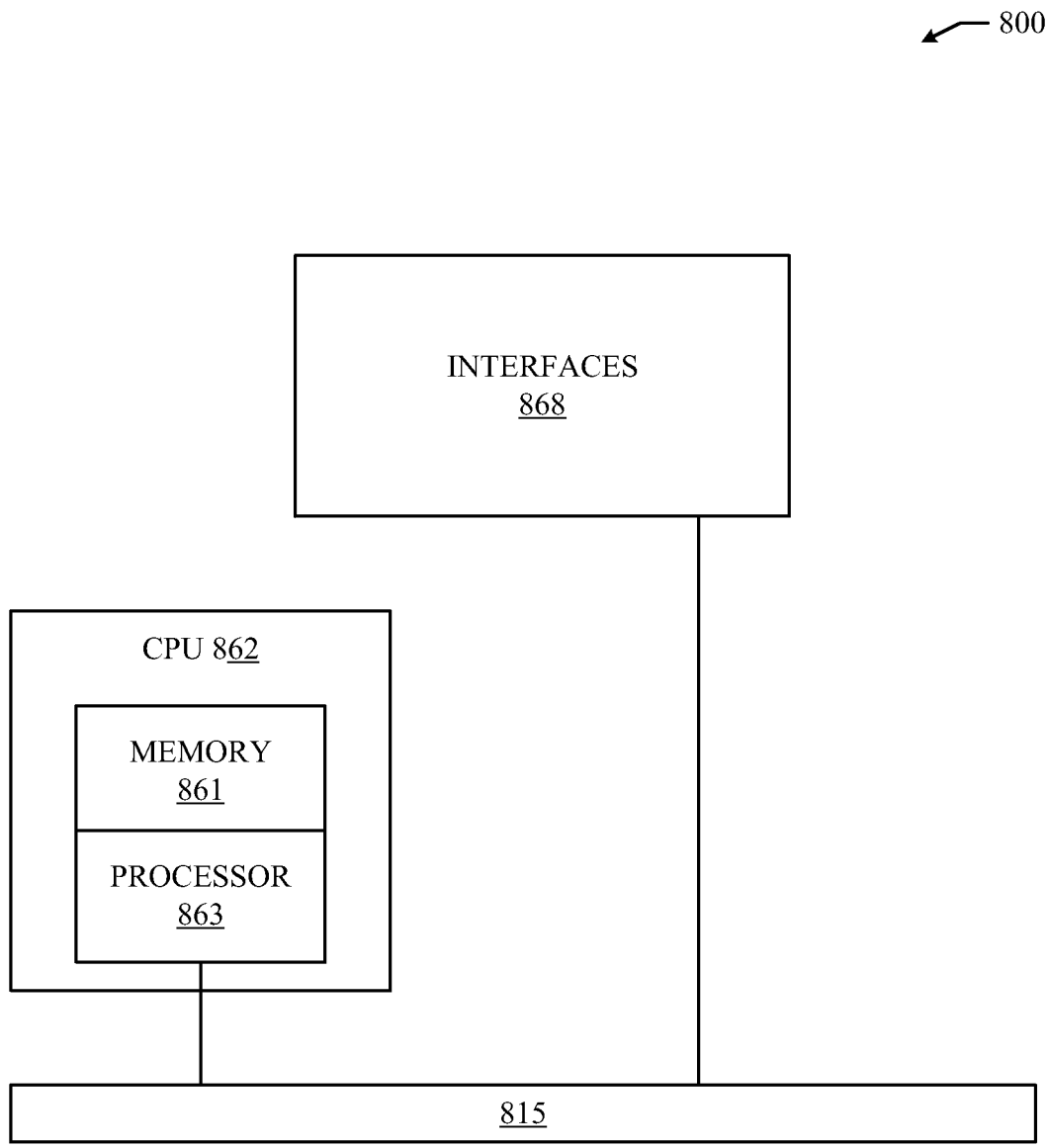
FIG. 8 illustrates an exemplary computing device in accordance with various implementations of the technology.

FIG. 8 illustrates an example computing device 800 suitable for implementing at least some aspects of the present technology. Computing device 800 includes a master central processing unit (CPU) 862, interfaces 868, and a bus 815 (e.g., a PCI bus). When acting under the control of appropriate software or firmware, the CPU 862 is responsible for executing packet management, error detection, and/or routing functions, such as miscabling detection functions, for example. The CPU 862 preferably accomplishes all these functions under the control of software including an operating system and any appropriate applications software. CPU 862 can include one or more processors 863 such as a processor from the Motorola family of microprocessors or the MIPS family of microprocessors. In an alternative embodiment, processor 863 is specially designed hardware for controlling the operations of the computing device 800. In a specific embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the computing device 800. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific computing device of the present technology, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 861) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

Figure 9A:
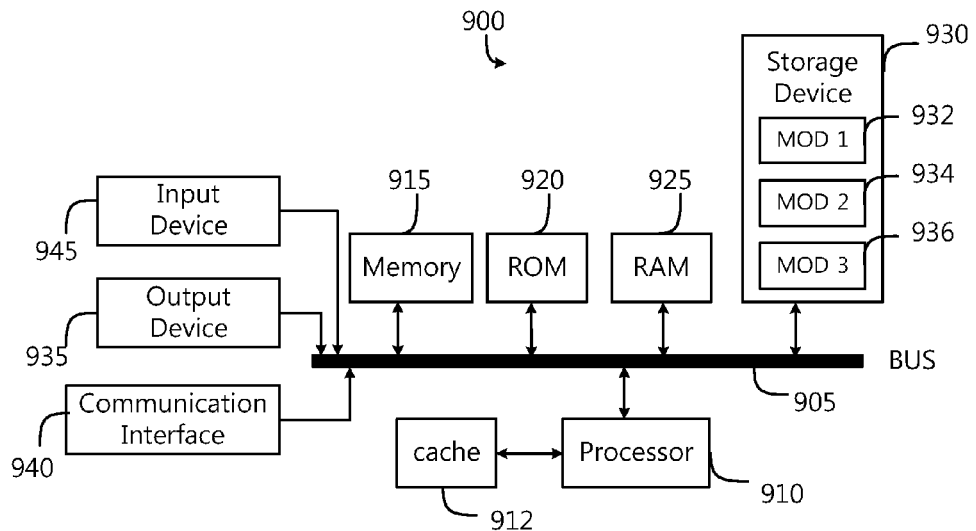
FIGS. 9A and 9B illustrate exemplary systems in accordance with various embodiments of the present technology.
Figure 9B:
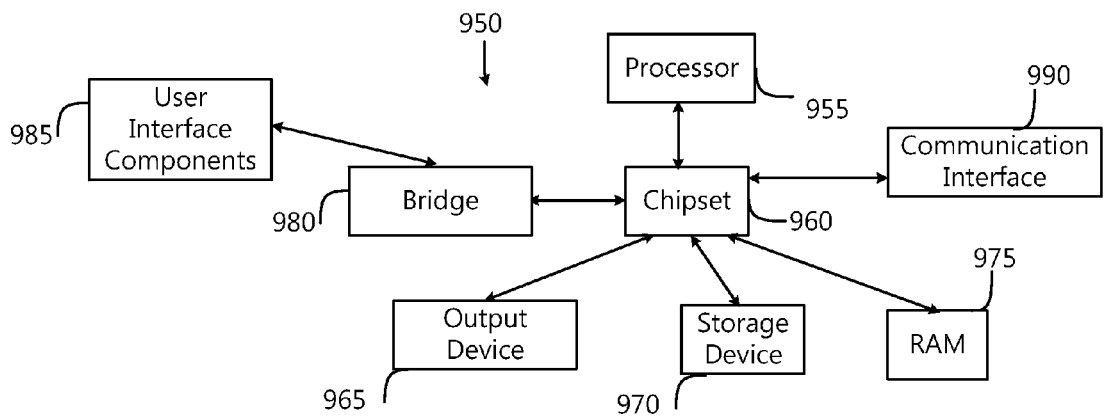

FIG. 9A, and FIG. 9B illustrate example possible systems in accordance with various aspects of the present technology. The more appropriate embodiment will be apparent to those of ordinary skill in the art when practicing the present technology. Persons of ordinary skill in the art will also readily appreciate that other system examples are possible.

FIG. 9A illustrates a conventional system bus computing system architecture 900 wherein the components of the system are in electrical communication with each other using a bus 905. Example system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 can be available for use as well. The memory 915 can include multiple different types of memory with different performance characteristics. The processor 910 can include any general purpose processor and a hardware module or software module, such as module 932, module 934, and module 936 stored in storage device 930, configured to control the processor 910 as well as a special-purpose processor where software instructions are incorporated into the actual processor design. The processor 910 can essentially be a completely self-contained computing system, containing multiple cores or processors, a bus, memory controller, cache, etc. A multi-core processor can be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here can easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, output device 935 (e.g., a display), and so forth, to carry out the function.

FIG. 9B illustrates a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example.

Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or RAM 975. Further, the machine can receive inputs from a user via user interface components 485 and execute appropriate functions, such as browsing functions by interpreting these inputs using processor 955.

It can be appreciated that example systems 900 and 950 can have more than one processor 910 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present technology provide systems and methods for security management in a rack system. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present invention can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technologies can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the invention as set forth in the claims.

What is claimed is:

1. A computer-implemented method for security management in a rack system, comprising:
   determining, by a baseboard management controller (BMC) of the rack system, whether a security feature of the rack system is enabled, wherein the security feature includes write protection mechanism for a flash chip that stores a BIOS;
   in response to the security feature being enabled, causing a security module to be activated prior to an operating system of the rack system being loaded;
   determining, by the security module during a power-on self-test (POST), whether a platform firmware module has security signed;
   in response to the platform firmware module having security signed, enabling the POST to continue; and
   in response to the platform firmware module not having security signed, stopping the POST.

2. The computer-implemented method of claim 1, further comprising:
   checking each unified extensible firmware interface (UEFI) driver of the rack system by comparing a corresponding signature with signatures in an authorized signature list; and
   reporting a status of the checking to a controller of the rack system.

3. The computer-implemented method of claim 1, further comprising:
   sending a value of cryptographic hash function from a trust platform module (TPM) to a controller of the rack system; and
   enabling the controller to modify an authorized signature list.

4. The computer-implemented method of claim 1, further comprising:
   receiving an executable image from a UEFI driver;
   comparing a signature of the executable image with signatures in an authorized signature list; and
   in response to determining that the signature of the executable image is unsigned, enabling a controller of the rack system to override the executable image with a gold key.

5. The computer-implemented method of claim 4, further comprising:
   receiving a corresponding policy from the controller for the UEFI driver; and
   excluding the UEFI driver if a corresponding signature of the UEFI driver is not in the authorized signature list.

6. The computer-implemented method of claim 4, further comprising:
   invoking a call-back routine when the UEFI driver is accessing the rack system during the POST; and
   blocking an IO protocol or a network protocol of the UEFI driver prior to receiving an authorization from the controller.

7. The computer-implemented method of claim 4, further comprising
   receiving a security-key request from a device firmware or an operating system of the rack system; and
   generating an OEM IPMI command together with a key management interoperability protocol (KMIP) parameter complying with the controller.

8. The computer-implemented method of claim 1, further comprising:
   in response to the security feature not being enabled, causing a "no security" entry to be logged on a system event log (SEL) of the rack system.

9. The computer-implemented method of claim 1, further comprising:
   in response to the platform firmware module not having security signed, causing a "firmware not signed" entry to be logged on a SEL of the rack system.

10. The computer-implemented method of claim 1, wherein the security module is a Unified Extensible Firmware Interface (UEFI) security module.

11. A computing system, comprising:
    at least one processor;
    a security module; and
    memory including instructions that, if executed by the computing system, causes the computing system to:
       determine, by a baseboard management controller (BMC) of a rack system, whether a security feature of a rack system is enabled, wherein the security feature includes write protection mechanism for a flash chip that stores a BIOS;
       in response to the security feature being enabled, cause the security module to be activated prior to an operating system of the rack system being loaded;
       determine whether a platform firmware module has security signed;
       in response to the platform firmware module having security signed, allow a power-on self-test (POST) to continue; and
       in response to the platform firmware module not having security signed, stop the POST.

12. The computing system of claim 11, wherein the instructions that, upon being executed by the at least one processor, further causes the computing system to:
    check each UEFI driver of the rack system by comparing a corresponding signature with signatures in an authorized signature list; and
    report a status of the checking to a controller of the rack system.

13. The computing system of claim 11, wherein the instructions that, upon being executed by the at least one processor, further causes the computing system to:
    send a value of cryptographic hash function from a trust platform module (TPM) to a controller of the rack system; and
    enable the controller to modify an authorized signature list.

14. The computing system of claim 11, wherein the instructions that, upon being executed by the at least one processor, further causes the computing system to:
    receive an executable image from a UEFI driver;
    compare a signature of the executable image with signatures in an authorized signature list; and
    in response to determining that the signature of the executable image is unsigned, enable a controller of the rack system to override the executable image with a gold key.

15. The computing system of claim 14, wherein the instructions that, upon being executed by the at least one processor, further causes the computing system to:
- receive a corresponding policy from the controller for the UEFI driver; and
- exclude the UEFI driver if a corresponding signature of the UEFI driver is not in the authorized signature list.

16. The computing system of claim 14, wherein the instructions that, upon being executed by the at least one processor, further causes the computing system to:
- invoke a call-back routine when the UEFI driver is accessing the rack system during the POST; and
- block an IO protocol or a network protocol of the UEFI driver prior to receiving an authorization from the controller.

17. The computing system of claim 14, wherein the instructions that, upon being executed by the at least one processor, further causes the computing system to:
- receive a security-key request from a device firmware or an operating system of the rack system; and
- generate an OEM IPMI command together with a key management interoperability protocol (KMIP) parameter complying with the controller.

18. A non-transitory computer-readable storage medium including instructions that, when executed by at least one processor of a computing system, cause the computing system to:
- determine, by a baseboard management controller (BMC) of the computing system, whether a security feature of a rack system is enabled, wherein the security feature includes write protection mechanism for a flash chip that stores a BIOS;
- in response to the security feature being enabled, cause the security module to be activated prior to an operating system of the rack system being loaded;
- determine whether a platform firmware module has security signed;
- in response to the platform firmware module having security signed, allow a power-on self-test (POST) to continue; and
- in response to the platform firmware module not having security signed, stop the POST.

19. The non-transitory computer-readable storage medium of claim 18, wherein the instructions, when executed by the at least one processor of the computing system, further cause the computing system to:
- in response to the security feature not being enabled, cause a "no security" entry to be logged on a system event log (SEL) of the computing system.

20. The non-transitory computer-readable storage medium of claim 18, wherein the instructions, when executed by the at least one processor of the computing system, further cause the computing system to:
- in response to the platform firmware module not having security signed, cause a "firmware not signed" entry to be logged on a SEL of the computing system.

* * * * *